United States Patent [19]

Bebernes et al.

[11] Patent Number: 5,649,606

[45] Date of Patent: Jul. 22, 1997

[54] STEERING AND GROUND SPEED CONTROL MECHANISM OF A DUAL-PATH HYDROSTATIC DRIVE SYSTEM

[75] Inventors: Thomas Daryl Bebernes, Ottumwa; Robert James Johnston, Oskaloosa, both of Iowa

[73] Assignee: Deere & Company, Moline, Ill.

[21] Appl. No.: 451,818

[22] Filed: May 26, 1995

[51] Int. Cl.⁶ .................................................. B60K 17/00
[52] U.S. Cl. ........................... 180/307; 180/6.48; 71/496
[58] Field of Search .................................. 180/305, 307, 180/54.1, 6.2, 6.3, 6.48; 74/496, 498

[56] References Cited

U.S. PATENT DOCUMENTS

| | | | |
|---|---|---|---|
| 3,354,981 | 11/1967 | Swanson et al. | 180/307 |
| 3,869,138 | 3/1975 | Mlison | 74/496 X |
| 3,888,135 | 6/1975 | Goering | 74/496 |
| 3,897,840 | 8/1975 | Molzahn et al. | 180/6.48 |
| 4,600,075 | 7/1986 | Heidner et al. | 180/307 X |

*Primary Examiner*—Kevin Hurley

[57] ABSTRACT

A steering and ground speed control mechanism of a vehicle equipped with a dual-path hydrostatic drive system includes a pivot plate fixed to a vertical pivot post at a location between and equidistant from a pair of locations respectively linked to a pair of pump displacement control arms of a pair of pumps respectively coupled for delivering fluid to right- and left-hand drive motors coupled to right- and left-hand ground wheels. A train of elements for transferring steering inputs from a steering wheel to the pivot plate includes a timed belt and sprocket set with one of the sprockets being fixed to the pivot post and the other mounted to a fixed post together with a quadrant-shaped steering rack for pivotal movement about the fixed post in concert with the rack. Pivoting the pivot plate in opposite directions from a centered position causes different displacements of the pumps and, hence, in the two drive motors being driven at different speeds. A train of elements for transferring speed inputs from a speed control lever to shift the pivot plate back and forth in a nearly straight path includes a push-pull cable coupled between the lever and an arm having the pivot post pivotally mounted in one end thereof, with the arm being mounted for pivoting about the fixed post exclusive of the rack and sprocket. A spring-applied, hydraulically released latch is provided for latching the steering wheel and speed control lever in their respective "centered" and "neutral" positions when hydraulic pressure is absent and a "neutral" start switch is positioned for being activated for completing a vehicle starting circuit only when the steering wheel and speed control lever are in these positions.

18 Claims, 6 Drawing Sheets

STEERING AND GROUND SPEED CONTROL MECHANISM OF A DUAL-PATH HYDROSTATIC DRIVE SYSTEM

BACKGROUND OF THE INVENTION

The present invention relates to a vehicle having hydrostatically driven ground wheels and more particularly relates to controls for a dual-path hydrostatic drive system.

Self-propelled windrowers are typically driven through a dual-path hydrostatic drive system. That is to say, each of a pair of drive wheels is independently driven by a hydrostatic pump and motor set. The displacement and direction of fluid delivery of the pumps to the motors may be varied so as to effect changes in the speed and direction of output of the motors by adjusting the position of pump control arms in opposite directions from a "neutral" position. Steering is accomplished by causing one motor to be driven at a slower speed than the other by moving the control arms in opposite directions so that one pump displaces less fluid than the other, while speed/direction changes are accomplished by changing the speed/direction of both motors in unison by moving the pump control arms in unison to opposite sides of their respective "neutral" positions. On self-propelled windrowers, the operator interface with the pump and motor sets for accomplishing steering is typically by way of a steering wheel, while the interface for accomplishing speed/direction changes is typically a lever.

It is desirable to keep the steering and speed/direction control separate from each other so each may be done without affecting the other. One known way of achieving this is by providing a more-or-less horizontal steering control shaft having a pair of threaded areas of opposite hand onto which threaded collars respectively of a pair of pump control levers are received. The steering control shaft is coupled for being rotated by a steering wheel so that the pump control arms are pivoted in opposite directions for effecting steering in a desired direction corresponding to the direction of rotation of the steering wheel. Speed/direction changes are made by moving the steering control shaft fore-and-aft, thus effecting pivoting of the pump control arms in unison in the same direction. A disadvantage of this type of control mechanism is that the steering rate (number of turns lock-to-lock) of the steering wheel is limited by the pitch of the threads on the steering control shaft and the practical length limits of the pump control arms. Other disadvantages of this known control mechanism include the maintenance required due to using threaded joints in a dirty environment and of the mechanism not being easily adaptable for use with centering devices for returning the steering wheel to a centered position for effecting straight ahead travel when released.

Another known control system, which is provided with a mechanism for controlling steering which overcomes some of the disadvantages the threaded shaft type steering control mechanism, includes a pivotally mounted control plate coupled in a symmetrical fashion to the pump control arms with pivoting of the plate causing opposite movement of the arms, so as to slow down one drive wheel while increasing the speed of the other. Speed and direction changes in these systems are effected by a manually-operable control lever shiftable in opposite directions from a "neutral" position and coupled for causing the plate to be shifted substantially linearly in opposite directions so as to cause the pump control arms to move in concert in corresponding opposite directions. In one such control system, pivoting of the plate is accomplished by a length of roller chain extending from a relatively small sprocket that is coupled to a steering wheel controlled steering shaft, with free ends of the chain being coupled to opposite locations of the pivotally mounted control plate. However, this control system too has a serious shortcoming. Specifically, ground speed adjustments require a change in the length of the roller chain used to transmit motion of the steering shaft to the pivot plate. Although, this length change is absorbed through a spring located in the coupling joining one end of the chain with the pivot plate, a steering correction must be made for each ground speed adjustment. Furthermore, due to its many pivot joints, the chain introduces opportunities for looseness into the system which adversely affects the steering characteristics.

Still another known control system incorporates a rack and pinion arrangement coupled to the steering shaft for controlling steering. The pump control arms are moved through a series of linkages. Speed and direction is likewise controlled through a series of linkages. The main disadvantage of this type of system is that the number of joints or pivots and linkages used introduces opportunities for looseness in the system resulting in a complication of adjustments.

SUMMARY OF THE INVENTION

According to the present invention there is provided an improved system for controlling a dual-path hydrostatic ground drive system for a vehicle.

An object of the invention is to provide a steering and speed/direction control mechanism, as discussed above, which is of the type including a pivotally mounted control plate but having few joints or pivots for transmitting steering and speed/direction control inputs to the control plate.

Another object of the invention is to provide a steering and speed/direction control mechanism, of the type mentioned in the previous object, which includes easy steering characteristic adjustments for varying the differential between the slow down of the speed of the inside wheel and the increase of the speed of the outside wheel when steering the vehicle through a turn.

Yet another object of the invention is to provide a steering and speed/direction control mechanism, of the type described above, wherein steering motion is transferred to a first toothed belt sprocket by way of a steering rack meshed with a spur gear mounted to the steering shaft, a toothed belt acting to transfer motion to a second toothed belt sprocket which causes the control plate to pivot.

A further object of the invention is to provide a control mechanism for a vehicle dual-path hydrostatic ground drive system, as defined in the immediately preceding object, wherein an elastic structure is coupled to the steering rack for returning the steering wheel to a "centered" position for effecting straight ahead travel once the steering wheel is released.

Still a further object of the invention is to provide a control mechanism, as set forth in a preceding object, and further having a support arm pivotally mounted coaxially with the first toothed belt sprocket and supporting the second toothed belt sprocket together with the pivotally mounted control plate for swinging about the axis of the first toothed belt sprocket so that, by increasing swinging movement of the ground speed arm to either side of a "neutral" position, increasing forward or reverse speeds of the vehicle are accomplished.

Yet another object of the invention is to provide a control mechanism, as set forth in the immediately preceding object, wherein a releasable latch system is provided for automatically locking the steering rack in a centered position and the control plate in a "neutral" position corresponding to the speed/direction control lever being in its "neutral" position, when hydraulic pressure for holding the latch in a released condition is absent.

Another object of the invention is to provide a steering and ground speed/direction control mechanism which is arranged compactly and which, for the most part, can be preassembled before being mounted in place on the machine.

These and other objects will become apparent from a reading of the ensuing description together with the appended drawings.

DESCRIPTION OF THE PREFERRED EMBODIMENT

Figure 1:
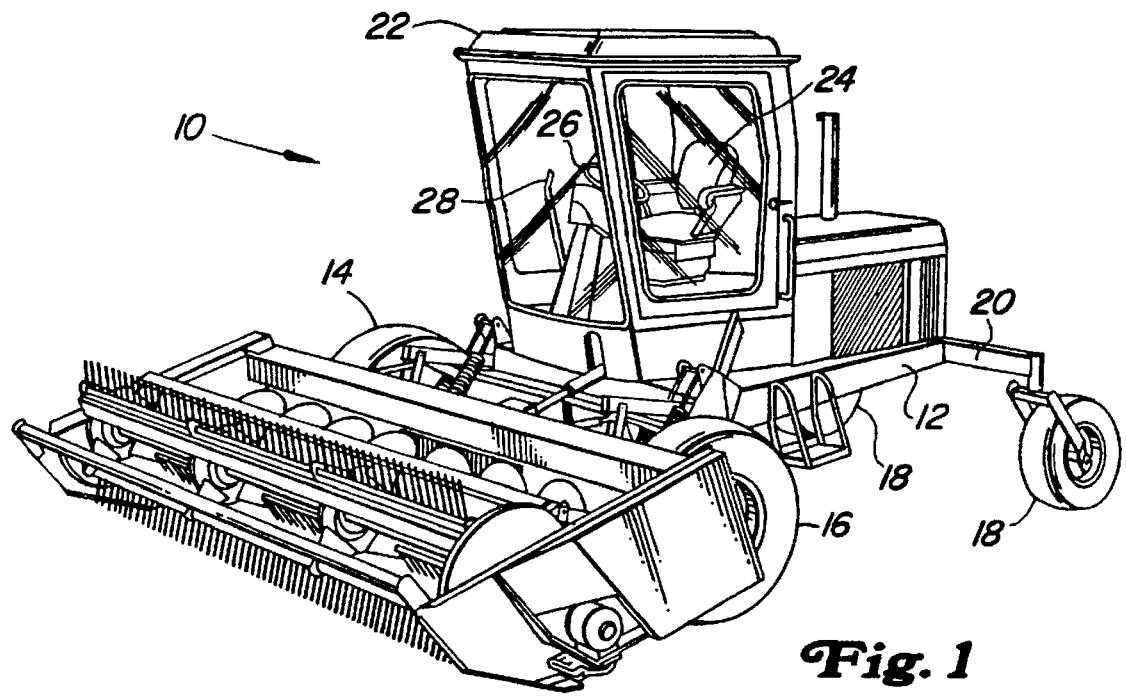
FIG. 1 is a left front perspective view of a self-propelled windrower with which a hydrostatic drive system constructed in accordance with the present invention is particularly adapted for use.
Figure 2:
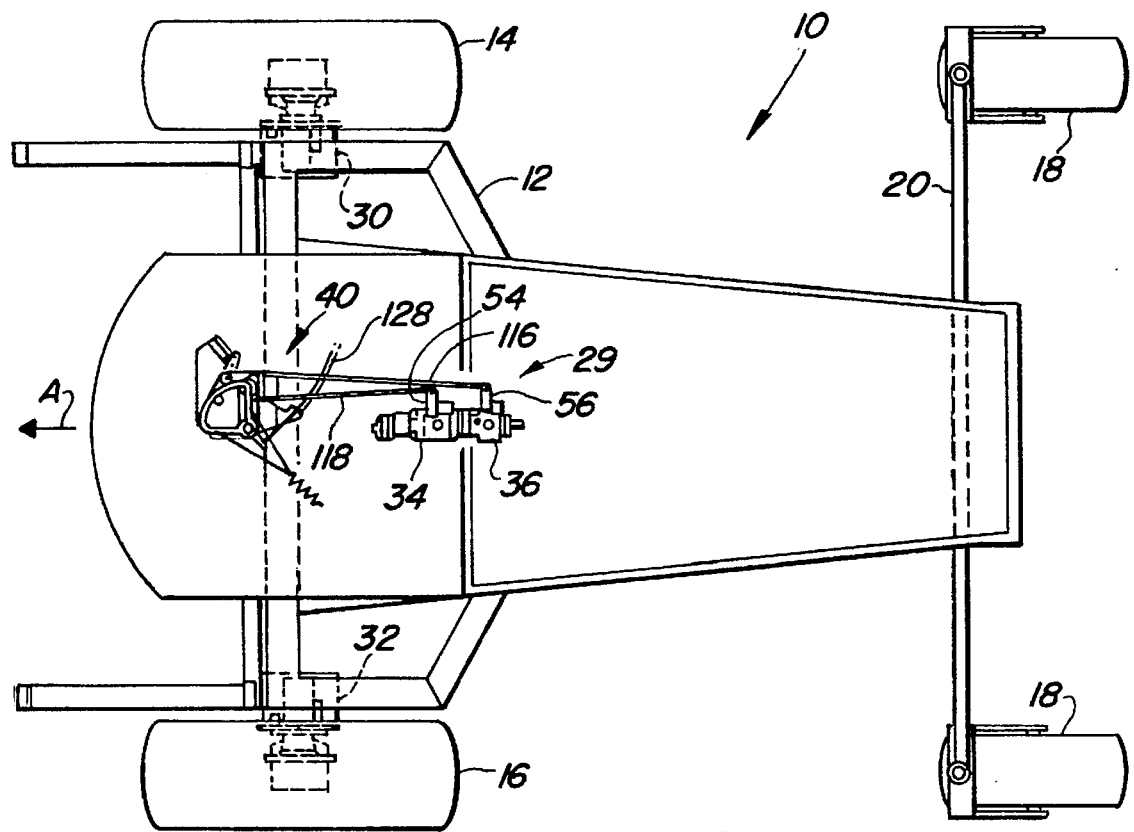
FIG. 2 is a somewhat schematic top view showing the placement of the hydrostatic drive system components within the general outline of the self-propelled windrower shown in FIG. 1.

Referring now to FIGS. 1 and 2, there is shown a self-propelled vehicle 10 in the form of a self-propelled mower-conditioner having a main frame 12 supported on right- and left-hand front drive wheels 14 and 16, respectively, and on a pair of rear ground wheels 18 castor-mounted to opposite ends of a cross axle 20 that is mounted to the main frame 12, in a known manner not shown, for oscillating about a horizontal, fore-and-aft axis located centrally between the wheels 18. An operator's cab 22 is supported on the forward end of the main frame 12 and contains a seat 24 mounted to a floor (not shown) of the cab in easy reach of a steering wheel 26 positioned forwardly of the seat and of a speed control lever 28 positioned rightwardly of the seat.

The drive wheels 14 and 16 are driven by a dual-path hydrostatic transmission system 29 including, (FIG. 2) right- and left-hand fixed displacement motors 30 and 32 respectively coupled to the right- and left-hand drive wheels 14 and 16. Front and rear variable displacement, reversible pumps 34 and 36, respectively, are conventionally fluid coupled to the motors 30 and 32, as by respective pairs of supply/return lines (not shown), are mounted centrally on the main frame 12 and are coupled for being driven by an output shaft of the vehicle engine (not shown).

Referring now also to FIGS. 3–6, there is shown a control mechanism 40 for receiving inputs from the steering wheel 26 and the speed control lever 28. The control mechanism 40 includes a mounting frame comprising an upper mounting plate 42 comprising a major horizontal portion, adapted for being mounted to the floor of the cab 22, and having a u-shaped cylinder and spring mounting bracket 43 formed at the right front thereof. The mounting plate 42 supports a first fixed post 44 having its upper end welded in place in a hole provided at a left central location in the mounting plate. A second fixed post 46 has its upper end similarly welded in place in a hole in the plate 42 spaced forwardly of the post 44 and adjacent a right-hand side of the plate. A lower mounting plate 48 also has a major horizontal portion held in engagement with the bottoms of the support posts 44 and 46 by capscrews 50 and 52 (see FIGS. 5 and 6, respectively) extending through respective holes provided in the plate 48 and being received in threaded holes extending axially into lower ends of the fixed posts.

Figure 4:
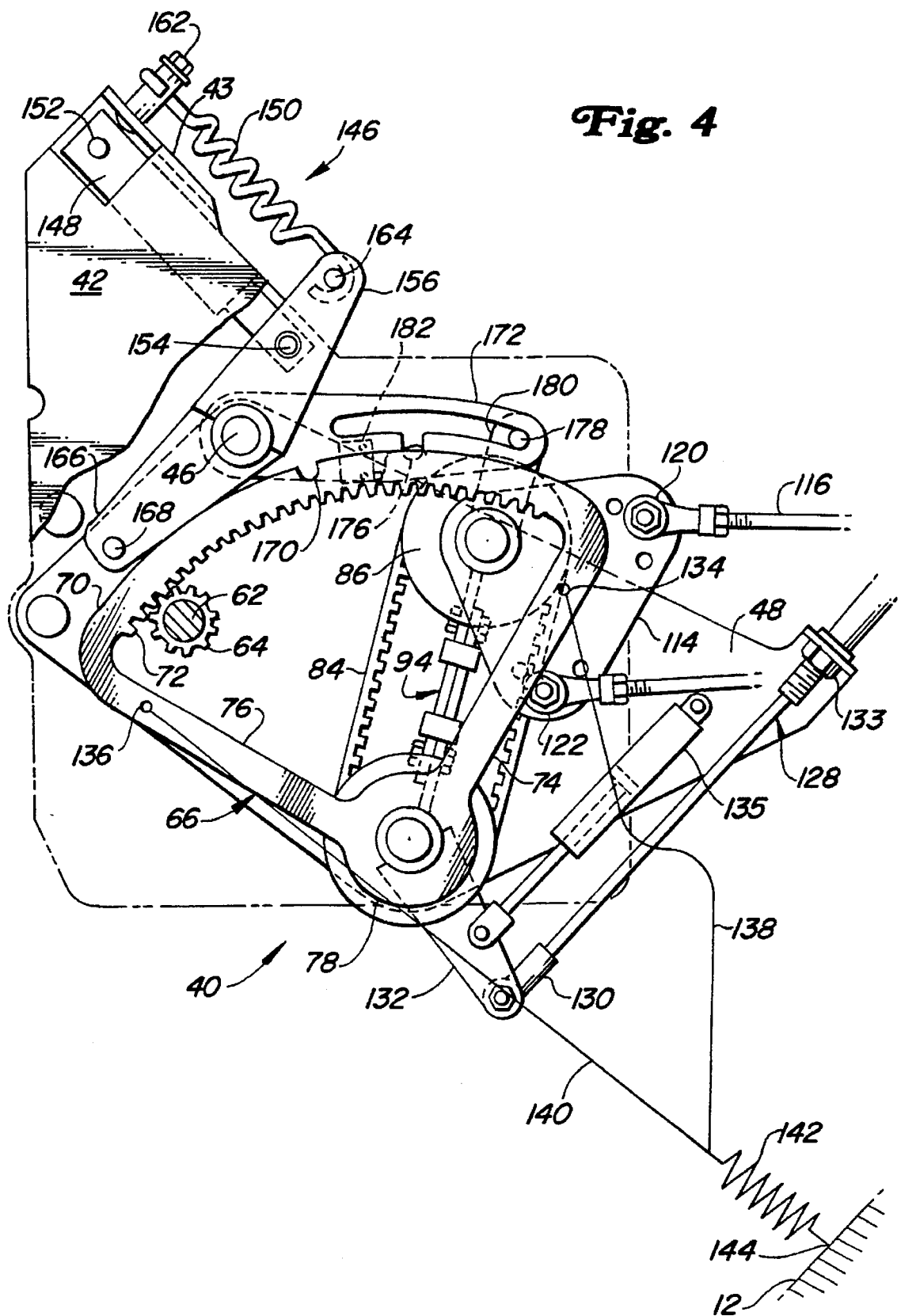
FIG. 4 is a view like FIG. 3 but showing the working components of the control mechanism in a condition corresponding to the steering wheel and speed/direction control lever being respectively turned and shifted for effecting a full right-hand turn at maximum forward speed.
Figure 5:
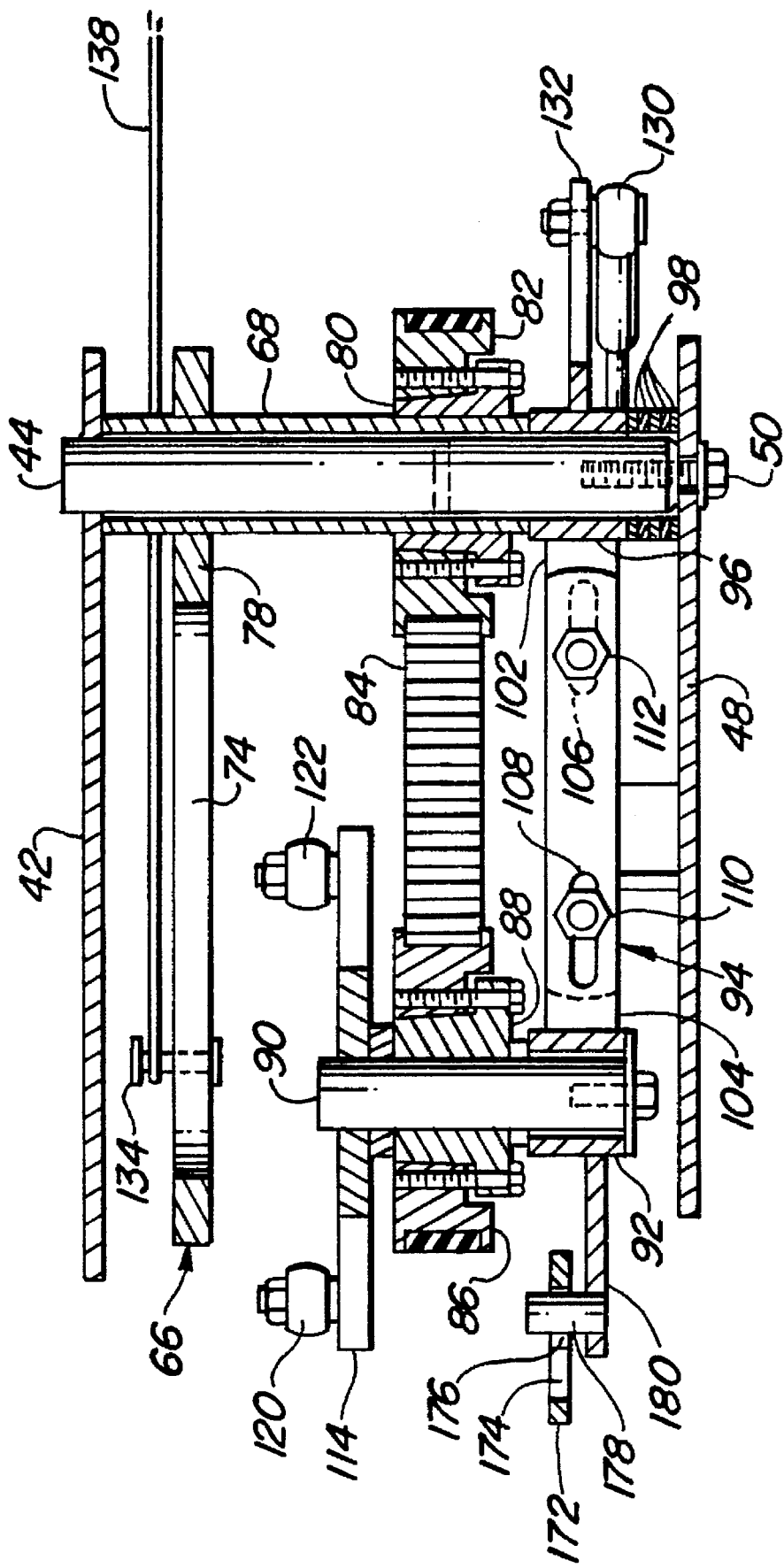
FIG. 5 is a vertical sectional view taken along line 5—5 of FIG. 3.
Figure 6:
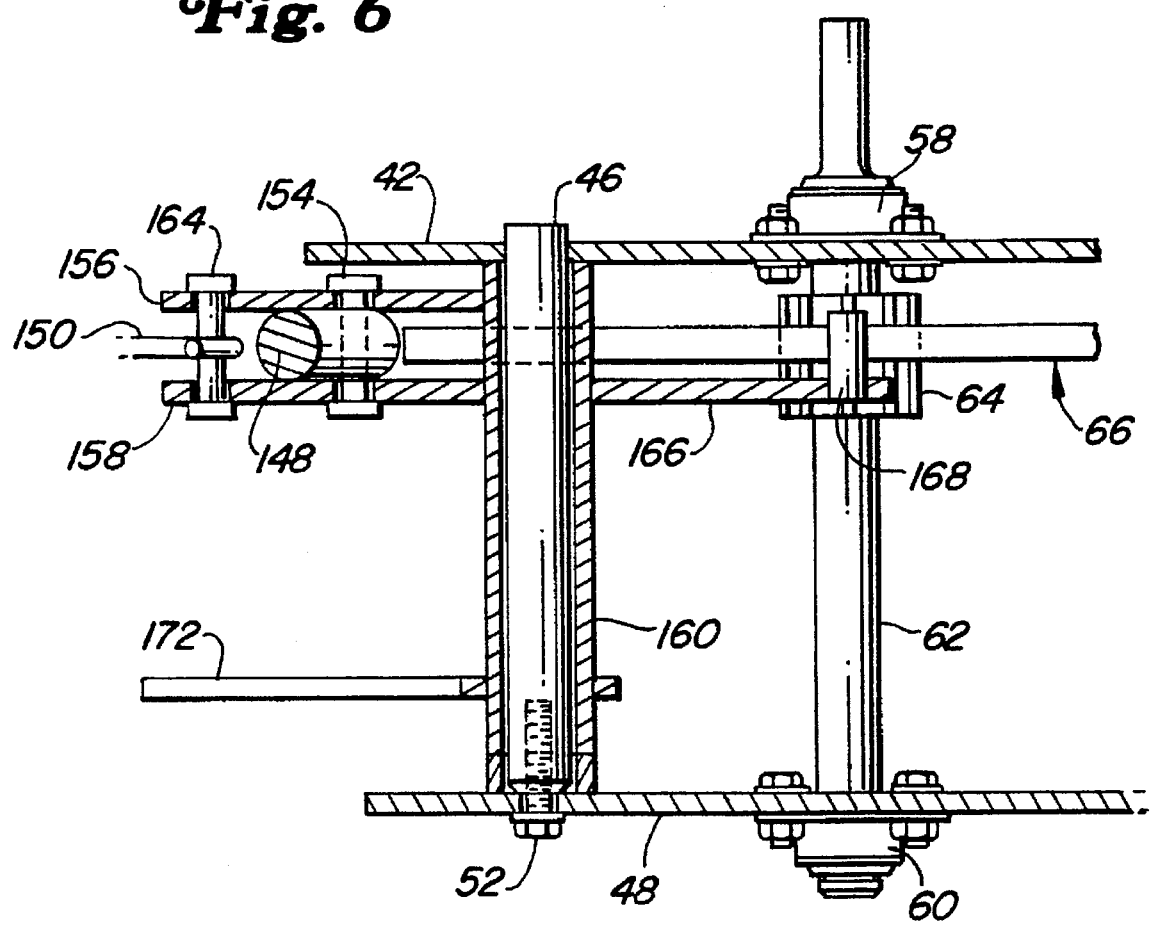
FIG. 6 is a vertical sectional view taken along line 6—6 of FIG. 3.

The steering wheel 26 initiates steering input signals which are coupled, by a train of motion transfer elements, for effecting desired movement of swash plate control arms 54 and 56, (FIG. 2) respectively, of the pumps 34 and 36. Upper and lower, self-aligning bearing assemblies 58 and 60 (FIG. 6) are respectively bolted to top and bottom surfaces of, and in alignment with vertically aligned holes provided in, the upper and lower mounting plates 42 and 48 at a location leftwardly and slightly forwardly (FIGS. 3 and 4) of the fixed post 46. The steering wheel 26 is coupled in a well known manner, not shown, to a steering shaft 62 mounted for rotation in the bearing assemblies 58 and 60. A pinion 64 is fixed on the steering shaft 62 at a location spaced a small distance below the upper plate 42. A quadrant-shaped steering rack 66 has an elongate cylindrical hub 68 (FIG. 5) mounted for rotation about the post 44 and having a lower end spaced above the lower plate 48. As can best be seen in FIGS. 3, 4 and 5, the steering rack 66 has an arcuate portion 70 provided with a set of internal gear teeth 72 meshed with the pinion 64. The arcuate portion 70 has its right- and left-hand ends respectively joined to right- and left-hand arms 74 and 76 which converge rearwardly to a circular portion 78 containing a centrally located hole receiving and being welded to an upper end section of the cylindrical hub 68. As can be seen in FIG. 5, a tapered split hub 80 of a toothed-belt sprocket 82 is clamped to the bottom end of the hub 68. The sprocket 82 is coupled, as by a toothed belt 84, to a another toothed-belt sprocket 86 having a tapered split hub 88 clamped onto a vertical pivot shaft 90 rotatably mounted in a first hub 92 of a horizontal belt sprocket/control plate support arm 94 having a second hub 96 pivotally mounted on the post 44 below the hub 68. The toothed belt 84 is preferably of the type used as a timing belt and may be called a timed belt. Belts suitable for use are marketed under the registered trademark Poly Chain® GT® Belts by the Gates Rubber Company of Denver, Colo. It is here noted that a stack of shims 98 takes up the clearance between the bottom of the support arm hub 96 and the lower plate 48.

For the purpose of aiding in the mounting of the toothed belt 84 about the sprockets 82 and 86, the arm 94 is constructed in two separate parts which are bolted together so as to make the arm 94 length-adjustable. Specifically, the arm 94 includes first and second parts respectively including strap-like sections 102 and 104 arranged in overlapping relationship to one another and having respective first ends welded to the hubs 96 and 92 and respectively containing elongate adjustment slots 106 and 108 located adjacent the hubs. A first clamping bolt 110 is received in the slot 108 and in a hole provided in the strap-like section 102 while a second clamping bolt 112 is received in the slot 106 and a hole provided in the strap-like section 104. Thus, it will be appreciated that removal and/or replacement of the belt 84 may be easily accomplished by loosening the bolts 110 and 112 and sliding the arm sections 102 and 104 together so as to create the clearance necessary for removing the belt. These steps would of course be reversed to install and tighten the same or a different belt. It is here noted that the slots 106 and 108 could be eliminated with the bolts being removed and the sections 102 and 104 being then separated in order to permit the removal or installation of the belt 84, this being acceptable due to the fact that construction of the belt 84 is such that it does not stretch during operation so there is no need for a way to take up slack due to the belt stretching.

Figure 3:
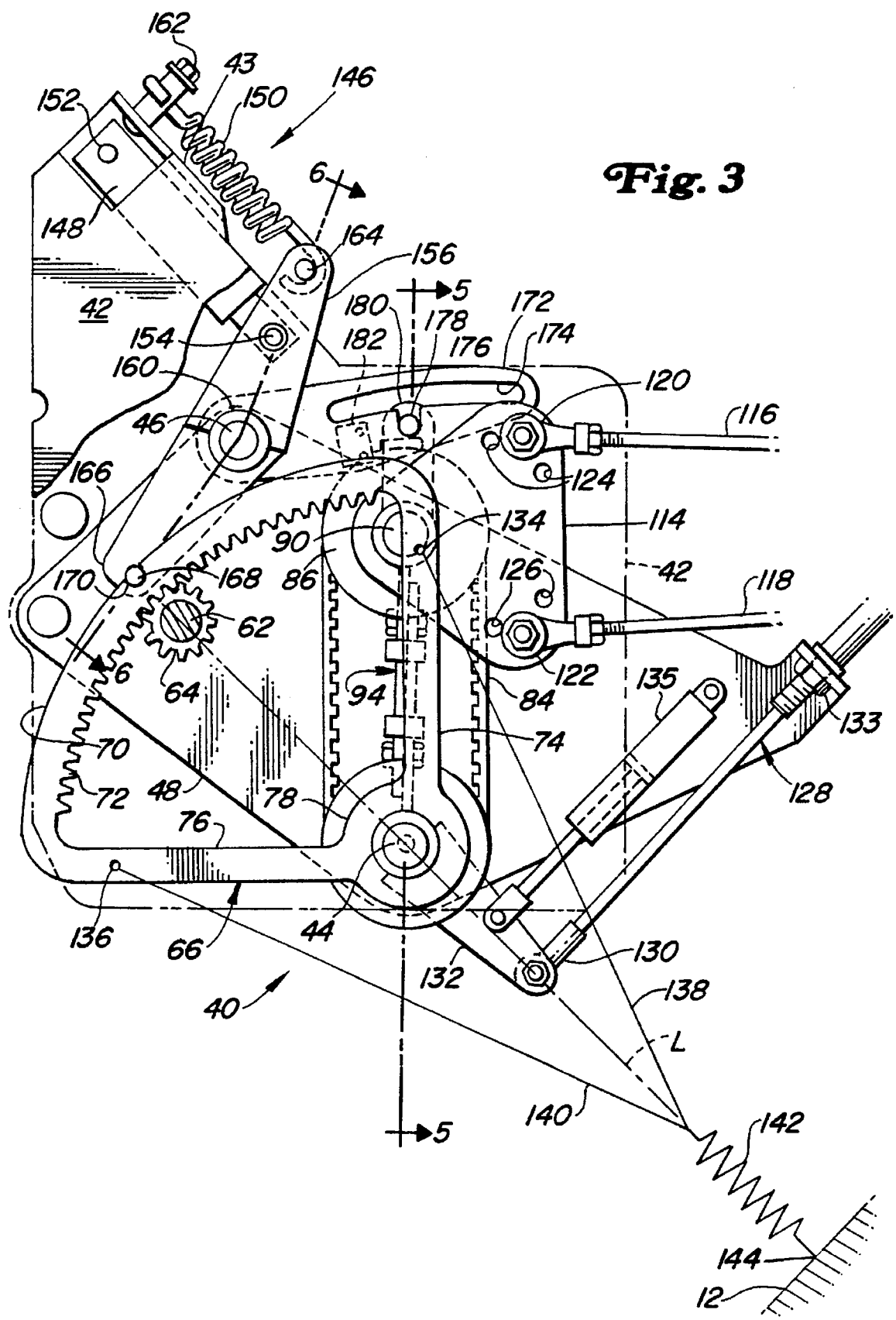
FIG. 3 is an enlarged top view of the control mechanism for the drive system shown in FIG. 2, with the top plate of the mounting frame being broken away to expose working components of the control mechanism, these components being shown in a condition corresponding to the steering wheel being in a "centered" position and the speed/direction control lever being in a "neutral" position.

Welded at an upper end portion of the pivot shaft 90 is a substantially triangular control plate 114 having the shaft 90 located at one corner and having a right-hand corner coupled to the pump control arm 56 of the rear pump 36 by a link 116 and having a left-hand corner coupled to the pump control arm 54 of the front pump 34 by a link 118. As shown in FIGS. 3 and 4, the links 116 and 118 are connected to the control plate 114 by respective connectors 120 and 122 which are located equidistant from the pivot shaft 90 so that pivotal movement of the control plate 114 will result in the pump control arms 54 and 56 being moved in opposite directions with the arm for controlling the motor 30 or 32 of the inside wheel 14 or 16 during a turn being moved further than the other arm so that the speed of the inside wheel is slowed more than the speed of the outside wheel is increased. Provided for allowing an operator to select different steering characteristics are symmetrically arranged sets of mounting holes 124 and 126 respectively provided for alternate locations of connection for the connectors 120 and 122. For example, if it is desired to increase the differential between the decrease in speed of the right-hand ground wheel 14 (inside wheel) and the increase in speed of the left-hand ground wheel 16 (outside wheel) when making a right-hand turn, this may be accomplished by moving the link connectors 120 and 122 to the rearmost of the sets of alternate mounting holes 124 and 126. It will be appreciated that because it is the fore-and-aft component of the rotary displacement of the connection holes that affects control arm position, other steering characteristics may be effected by selecting different combinations of connection holes for the placement of the connectors 120 and 122.

The speed/direction control lever 28 is coupled to one end of a cable, of a push-pull cable assembly 128, having its other end connected, by a connector 130, to a crank 132 welded to the hub 96 (FIG. 5) of the support arm 94. A sheath of the cable assembly 128 has one end attached in the vicinity of the lever 28 in a well known manner (not shown) while the other end of the sheath is secured, as at 133, to an upstanding ear forming part of the lower mounting plate 48. Provided for stabilizing any erratic operation that might occur due to "backlash" in the cable assembly 128, is a dashpot 135 of a known construction having piston provided with an orifice through which oil contained in the dashpot cylinder may pass to opposite sides of the piston as the dashpot is extended or retracted. The dashpot 135 is mounted between the crank 132 and a lug joined to the plate 48 so as to be generally parallel to the length of cable extending between the coupling 133 of the cable assembly 128 with the mounting plate 48 and the crank 132.

It is here noted that when the control lever 28 is in a "neutral" or zero speed position and the control mechanism 40 is in a corresponding "neutral" condition, as illustrated in FIG. 3, the crank 132, although it need not be so positioned, will lie in a vertical plane L containing the centers of the steering shaft 62, post 44 and pivot of connector 130. It is also noted that the plane L bisects the quadrant of the steering rack 66, which means that at this point the steering wheel 26 is in a "centered" position for steering the vehicle 10 straight ahead. Forward movement of the speed/direction control lever 28 from its "neutral" position will result in the cable of the push-pull cable assembly 128 acting to push the crank 132 thereby effecting clockwise pivotal movement of the arm 94 about the post 44. This results in the control plate 114 and, hence, links 116 and 118 moving rearwardly. Due to the length of the arm 94 and it being oriented at a right angle to the direction of travel A (FIG.), this rearward movement of the control plate 114 and links 116 and 118 is substantially linear and results in the pump control arms 54 and 56 being pivoted to cause the pumps 34 and 36 to deliver fluid to the motors 30 and 32 so as to cause the latter to power the ground wheels for propelling the vehicle 10 in the forward direction at a speed determined by the amount of forward displacement of the control lever 28 from its "neutral" position. Of course, reverse movement of the vehicle 10 may be accomplished in a similar manner by moving the control lever 28 in a rearward direction from its "neutral" position.

A return-to-center device is provided for automatically returning the steering rack 66 and, hence, the steering wheel 26 to its centered position upon release of the steering wheel. Specifically, coupled to the quadrant arms 74 and 76, at respective locations 134 and 136 adjacent opposite ends of the arcuate portion 70, are first ends of cables 138 and 140. Second ends of the cables 138 and 140 are attached to one end of a coil tension spring 142 having its opposite end attached to the frame 12 at a site 144 located in the vertical plane L.

When the control system 40 is in its condition shown in FIG. 3, steering rack 66 will be in a "centered" position, corresponding to the "centered" position of the steering wheel 26, and the cables 138 and 140 will be equally tensioned by the spring 142. It will be appreciated then that a rightward steering input from the steering wheel 26 will cause clockwise rotation of the pinion 64, resulting in the steering rack 66 pivoting clockwise about the post 44. This movement of the rack 66 will cause the cable 140 to be pulled forwardly, thus further loading the tension spring 142, while the cable 138 goes slack. Upon release of the steering wheel 26, the spring 142 will act through the cable 140 to return the steering rack 66 to its "centered" position which results in the pinion 64 being rotated to return the steering wheel 26 to its "centered" position.

The vehicle 10 is provided with a brake system, not shown, utilizing pressure-released, spring-applied braking elements so that braking is effected any time fluid pressure for effecting release of the brakes is absent from the system. This fluid pressure is normally supplied by an engine-driven pump and it follows then that braking will automatically be effected any time the engine stops. The source of fluid pressure for effecting release of the brake elements is also used for effecting release of a spring-applied, pressure-released latch embodied in a latch system 146 for releasably retaining the control system 40 in its condition shown in FIG. 3.

Specifically, the latch system 146 includes a one-way, latch-release cylinder 148 and a latch-applying coil tension spring 150. A head end of the cylinder 148 is connected, as at a pin 152, to the mounting bracket 43 while a rod end of the cylinder is received between and connected, as at a pin 154, to upper and lower input arms 156 and 158 (FIG. 6), respectively, welded to an elongate latch arm hub 160 pivotally mounted on the post 46. The spring 150 extends parallel to the cylinder 148 and has hooks at opposite ends respectively attached to a pin 162 extending through a flange forming part of the bracket 43 and to a pin 164 mounted to the input arms 156 and 158 at a location outboard of the cylinder 148. An extension of the lower arm 158 defines a steering latch arm 166 carrying a vertical latch pin 168, which, when the rack 66 is in its "centered" position shown in FIG. 3 with no fluid pressure being routed to the cylinder 148, is biased by the spring 150 to a latch position seated in a semi-cylindrical notch or receptacle 170 provided in the steering rack arcuate quadrant portion 70 at a location half-way between the opposite ends thereof on the side opposite from the internal gear teeth 72.

Also biased to a latch position by the spring 150 is a speed/direction latch arm 172 welded to a lower portion of the latch arm hub 160 (FIG. 6) and containing an arcuate slot 174 formed at a radius about the post 44 and into which opens a notch or recess 176. Received in the slot 174 is a speed/direction latch pin 178 carried at the end of a latch pin arm 180 welded to the support arm hub 92 (FIG. 5) diametrically opposite from the support arm 94. The length of the slot 174 corresponds to the distance travelled by the pin 178 when the speed/direction control lever 28 is moved between extreme "forward" and "reverse" positions, with the notch 176 being at the location in the slot corresponding to the "neutral" position of the control lever 28. Thus, with the speed/direction control lever 28 in its "neutral" position and the hydraulic cylinder 148 deactivated, the spring 150 will act to move the arm 172 so as to engage the pin 178 in the recess 176, as shown in FIG. 3. A "neutral" interlock switch, shown at 182, is mounted to the arm 172 and has its actuator positioned across the recess 176 for being engaged and moved by the pin 178 for completing a starting circuit (not shown) only when the steering lock and speed/direction lock pins 168 and 178, respectively, are engaged in the notches or recesses 170 and 176 to thus prevent the vehicle from being started unless the steering wheel 26 is in its "centered" position corresponding to straight ahead travel and unless the speed/direction control lever 28 is in its "neutral" position.

Figure 7:
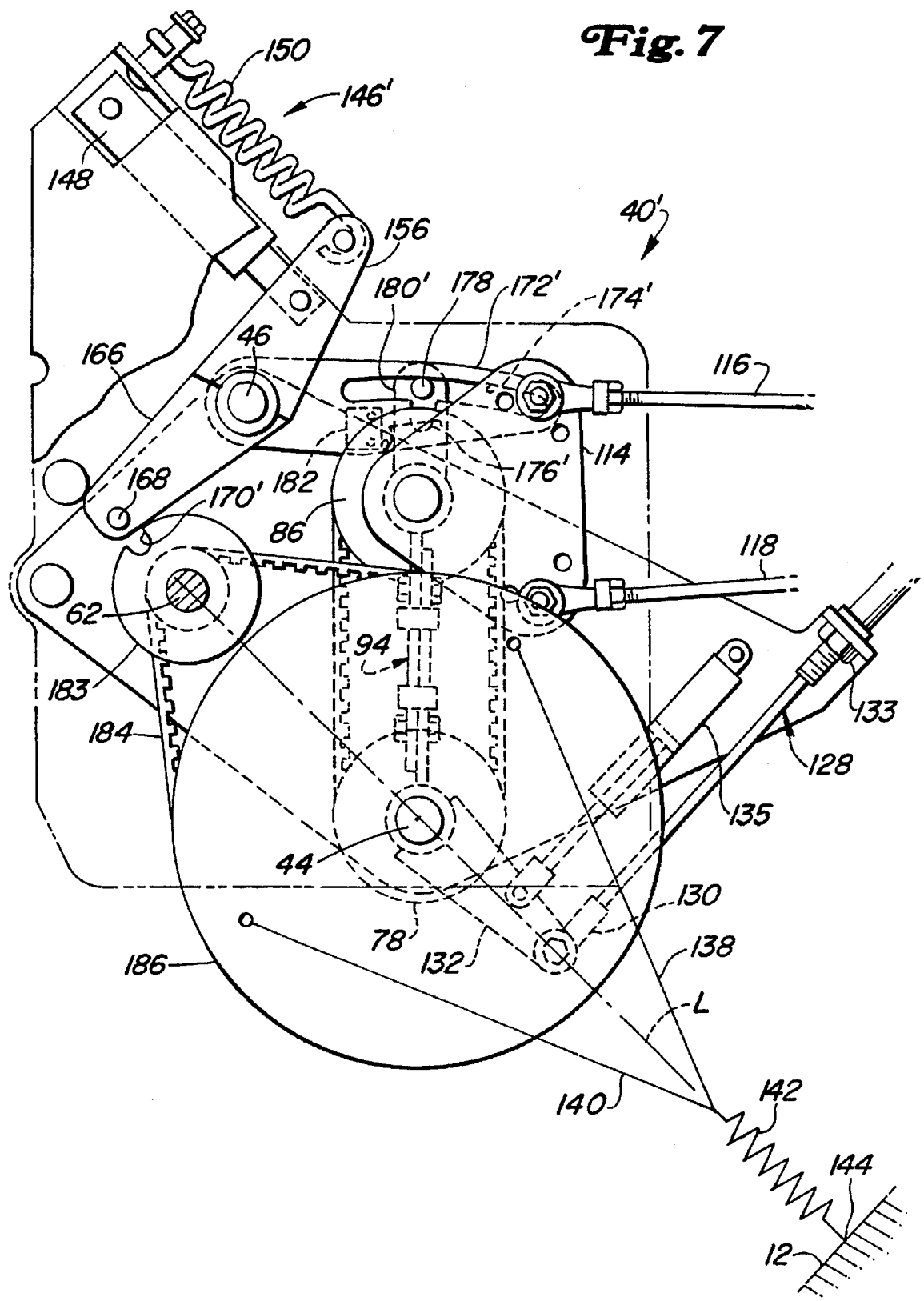
FIG. 7 is a top plan view showing an alternate embodiment of the control mechanism for transmitting steering control inputs to the pivotally mounted control plate.

Referring now to FIG. 7, an alternate control mechanism 40' is shown which includes much of the same structure included in the above-described mechanism 40 with like elements being indicated by the same reference numerals. The main difference between the control mechanism 40' and the previously described control mechanism 40 is that the steering rack and pinion assembly is replaced by a toothed belt and sprocket arrangement. Specifically, mounted to the steering shaft 62 is a toothed sprocket 183 that is coupled, by way of a toothed belt 184, to a toothed sprocket 186 mounted to the upper end section of the cylindrical hub 68 (FIG. 5). Thus, the drive train defined by the toothed sprockets 182 and 186 and the belt 184 operate to transfer the steering input of the steering wheel 26 to the hub 68 and, hence, to the toothed sprocket 78, belt 84 and sprocket 86, in much the same way as does the pinion 64 and rack 66. The forward ends of the cables 138 and 140 of the centering mechanism are coupled to appropriate locations of the pulley 186 causing the latter to be returned to the position illustrated in FIG. 7 which corresponds to the "centered" position of the steering wheel 26. A latch mechanism 146' which operates in all respects like the previously described latch mechanism 146 is provided for simultaneously latching the steering wheel 26 in its "centered" position for straight ahead travel and for latching the speed/direction control lever 28 in its "neutral" position. The diameter of the sprocket 183 is enlarged beyond that necessary for carrying the belt 184 for the purpose of being provided with a notch or recess 170' to accommodate the latch pin 168 for fixing the steering wheel 26 in its centered position whenever fluid pressure is absent from the latch-release cylinder 148. A latch arm 172' similar in construction to the latch arm 172 is provided with an arcuate slot 174' formed at a radius about the post 44 and into which opens a recess or notch 176' for receiving the pin 178 carried by the arm 180' in the absence of pressure being routed to the cylinder 148.

It is here noted that except for the connections of the links 116, control cable assembly 128, hydraulic connection to cylinder 148 and electrical connection for switch 182 all of the elements of both control mechanisms 40 and 40' may be sub-assembled to the frame plates 42 and 48 prior to the upper plate 42 being bolted into place on the floor of the cab 22.

The operation of the control mechanisms 40 and 40' is thought to be clear from the description. Suffice it to say that the usage of the timing belt 84 in conjunction with the rack 66 and pinion 64, or alternatively (FIG. 7) in combination with the timing belt 184 provides a way of transferring steering and speed/direction control inputs to the hydrostatic transmission pump control arms 54 and 56 which eliminates wear prone joints which tend to complicate adjustments intended to keep the transfer of the inputs true and effective.

We claim:

1. In a vehicle steering and speed/direction control mechanism for a dual path hydrostatic transmission of a type including a pair of pumps respectively coupled for supplying pressure fluid to and receiving return fluid from a pair of hydraulic wheel drive motors respectively coupled to a pair of drive wheels and including control arms which are pivotable for effecting changes in the displacement of the pumps and direction of fluid flow to the pumps and, hence, changes in the speed/direction of the drive motors, a pair of links having first ends respectively coupled to the control arms of the pair of pumps and second ends coupled to a control plate at a pair of locations respectively spaced in opposite directions from a pivot axis defined by a vertical pivot post fixed to the control plate and mounted for rotation in a free end of a support arm mounted for swinging about a fixed post, a first train of motion transfer elements connected between a steering input member and the control plate for turning the latter in opposite directions from a centered position in response to moving the steering input member in opposite directions from a centered position, and a second train of motion transfer elements being connected between a speed/direction control input member and the support arm for pivoting the latter in opposite directions in response to movement of the speed/direction control input member in opposite directions from a neutral position, the improvement comprising: said first train of motion transfer elements including a toothed belt extending about first and second toothed sprockets of equal diameter; said first sprocket being mounted for rotation about said fixed post, exclusive of said support arm, and said second sprocket being fixed to said pivot post for pivoting in concert with said control plate; and said first train of motion transfer elements further including means for rotating said first sprocket in opposite directions in response to said steering input member being moved in opposite directions from its centered position.

2. The vehicle steering and speed/direction control mechanism defined in claim 1 wherein said first train of motion transfer elements further includes an upright steering shaft; a pinion mounted to said steering shaft; and a quadrant-shaped rack meshed with said pinion and being mounted for pivoting about said fixed post in concert with said first toothed sprocket.

3. The vehicle steering and speed/direction control mechanism defined in claim 2 wherein said rack has an elongate hub; and said first toothed sprocket being fixed to said elongate hub.

4. The vehicle steering and speed/direction control mechanism defined in claim 2 wherein said steering input member comprises a steering wheel operatively coupled to said steering shaft and turnable in opposite directions from said centered position to correspondingly swing said rack to opposite sides of a centered position; and a center-return mechanism comprising a pair of cables having first ends coupled to said rack at respective locations at opposite sides of and equidistant from said steering shaft when the steering wheel is in said centered position; said cables being of equal length and having a tension spring having a first end coupled to second ends of the cables and a second end anchored to the frame at a location which is located on a vertical plane passing through said fixed post and said steering shaft.

5. The vehicle steering and speed/direction control mechanism defined in claim 1 wherein said support arm is constructed of first and second sections; and releasable connection means joining said sections and being selectively released for establishing sufficient slack in the toothed belt to permit removal of said toothed belt from said first and second toothed sprockets, and which then may be reconnected to hold the toothed belt in a tight operating condition.

6. The vehicle steering and speed/direction control mechanism defined in claim 1 wherein said first train of motion transfer elements further includes an upright steering shaft; a third toothed belt sprocket being mounted to the steering shaft; and a fourth toothed belt sprocket being mounted for rotating about said fixed post in concert with said first toothed sprocket.

7. The vehicle steering and speed/direction control mechanism defined in claim 1 wherein said second train of motion transfer elements comprises a speed/direction control lever mounted for movement in opposite directions from said neutral position; and a push-pull cable arrangement being coween said lever and said support arm.

8. The vehicle steering and speed/direction control mechanism defined in claim 1 wherein said control plate includes first and second sets of connection points with individual points of each set being spaced an equal distance from said pivot post; and said pair of locations respectively being at one point of each set, whereby different steering characteristics can be obtained by connecting the pair of links to different locations in one or the other or in both of said sets of connection points.

9. In a vehicle steering and speed/direction control mechanism for a dual path hydrostatic transmission of a type including a pair of pumps respectively coupled for supplying pressure fluid to and receiving return fluid from a pair of hydraulic wheel drive motors respectively coupled to a pair of drive wheels and including control arms which are pivotable for effecting changes in the displacement of the pumps and direction of fluid flow to the pumps and, hence, changes in the speed/direction of the drive motors, a pair of links having first ends respectively coupled to the control arms of the pair of pumps and second ends coupled to a control plate at a pair of locations respectively spaced in opposite directions from a pivot axis defined by a vertical pivot shaft fixed to the control plate and mounted for rotation in a free end of a support arm mounted for swinging about a first fixed post, a first train of motion transfer elements connected between a steering input member and the control plate for turning the latter in opposite directions from a centered position in response to moving the steering input member in opposite directions from a centered position, and a second train of motion transfer elements being connected between a speed/direction control input member and the support arm for pivoting the latter in opposite directions in response to movement of the speed control input member in opposite directions from a neutral position, the improvement comprising: said first train of motion transfer elements containing a first latch recess; a releasable latch mechanism including a second fixed post; a latch arm assembly mounted for pivoting about said second fixed post between latch and release positions; a hydraulic cylinder being coupled to said latch arm assembly for moving the latter to its release position when fluid pressure is routed to said cylinder; a spring being coupled to said latch arm assembly for moving the latter to said latch position in the absence of fluid pressure being routed to said cylinder; said latch arm assembly including a first arm portion carrying a latch pin disposed for moving into register with said first latch recess when the first train of motion transfer elements is in a centered position corresponding to said centered position of said steering input member and a second arm portion containing a slot formed arcuately about said first fixed post, with a second latch recess opening into said slot; said support arm having an extension extending away from said first fixed post and carrying a second latch pin which is received in said slot and being disposed for moving into register with said second latch recess when the second train of motion transfer elements is in a neutral position corresponding to said neutral position of said speed/direction input member, whereby when said steering control input member is in its centered position and said speed/direction control input member in its neutral position, said first latch pin will be moved into said first recess and said second recess will be moved onto said second latch pin by the action of said spring in the absence of fluid pressure in said cylinder.

10. The vehicle steering and speed/control mechanism defined in claim 9 and further including a neutral start switch located for being actuated to complete a circuit for permitting starting of the vehicle only when the latch arm assembly is in its latch position, whereby starting of the vehicle is prevented when either the steering input member is not in its centered position or the speed/direction control input member is not in its neutral position.

11. The vehicle steering and speed/direction control mechanism defined in claim 10 wherein said first train of motion transfer elements includes an arcuate rack mounted for pivoting about said first fixed post; and said first recess being located in said rack at a location midway between opposite ends of the same.

12. The vehicle steering and speed/direction control mechanism defined in claim 10 wherein said first train of motion transfer elements includes a steering shaft and a toothed belt sprocket mounted on said steering shaft; and said first recess being located in an outer peripheral location in a flange of said sprocket.

13. The vehicle steering and speed/direction control mechanism defined in claim 11 and further including a centering mechanism including a pair of cables having first ends coupled to said rack at locations equi-distant from said fixed post and adjacent opposite ends of said rack; a tension spring having a first end coupled to second ends of said cables and having another end anchored at a location on a vertical plane passing through said steering shaft and fixed post.

14. The vehicle steering and speed/direction control mechanism defined in claim 10 wherein said second train of motion transfer elements including a push-pull cable assembly having a cable coupled to a second extension of said support arm located on said vertical plane when said second train of motion transfer elements is in its neutral position.

15. In a vehicle steering and speed/direction control mechanism for a dual path hydrostatic transmission of a type including a pair of pumps respectively coupled for supplying pressure fluid to and receiving return fluid from a pair of hydraulic wheel drive motors respectively coupled to a pair of drive wheels and including control arms which are pivotable for effecting changes in the displacement of the pumps and direction of fluid flow to the pumps and, hence, changes in the speed/direction of the drive motors, a pair of links having first ends respectively coupled to the control arms of the pair of pumps and second ends coupled to a control plate at a pair of locations respectively spaced in opposite directions from a pivot axis defined by a vertical pivot post fixed to the control plate and mounted for rotation in a free end of a support arm mounted for swinging about a fixed post, a first train of motion transfer elements connected between a steering input member and the control plate for turning the latter in opposite directions from a centered position in response to moving the steering input member in opposite directions from a centered position, and a second train of motion transfer elements being connected between a speed/direction control input member and the support arm for pivoting the latter in opposite directions in response to movement of the speed/direction control input member in opposite directions from a neutral position, the improvement comprising: a sub-assembly defined by vertically spaced upper and lower support plates; said fixed post having an upper end welded in a hole provided in said upper plate and having a lower end bolted to said lower support plate; said first train of motion transfer elements including: a vertical steering shaft rotatably supported by said upper and lower support plates, a drive element fixed for rotation with said steering shaft and drive means connected between said drive element and said control plate for effecting rotation of the control plate in opposite directions from a centered position in response to rotation of said steering shaft in opposite directions from a corresponding centered position.

16. The vehicle steering and speed/direction control mechanism defined in claim 15 wherein said drive element comprises a pinion and said drive means includes a rack mounted for pivoting about said fixed post, a first toothed belt sprocket mounted for pivoting about said fixed post in concert with said rack, a second toothed belt sprocket mounted to said pivot post for pivoting in concert with said control plate, and a toothed belt extending about said first and second toothed belt sprockets.

17. The vehicle steering and speed/direction control mechanism defined in claim 15 and further including a steering and speed/direction control latch mechanism including a second fixed post having an upper end portion welded in said upper support plate and a lower end bolted to said lower support plate; a latch arm assembly mounted for rotation about said second fixed post between latch and release positions; a spring coupled between said latch arm and upper plate so as to bias the latch arm toward said latch position and a hydraulic cylinder coupled between said upper plate and latch arm for urging the latter towards said release position when fluid pressure is routed to said cylinder; and said latch arm and first train of motion transfer elements having first cooperating latch means for holding said first train of motion transfer elements in a centered position corresponding to said centered position of said steering input member when the latch arm is in its latch position and said latch arm and second train of motion transfer elements having second cooperating latch means for holding said second train of motion transfer elements in a neutral position corresponding to said neutral position of said speed/direction control input member when the latch arm is in its latch position.

18. The vehicle steering and speed/direction control mechanism defined in claim 15 wherein said drive element is a first toothed belt sprocket and said drive means includes a second toothed belt sprocket mounted for rotation about said fixed post separate from said support arm, a first toothed belt extending about said first and second toothed belt sprockets, a third toothed belt sprocket mounted for rotation about said fixed post in concert with said second toothed belt sprocket, a fourth toothed belt sprocket mounted on said pivot post for rotation in concert with said control plate, and a second toothed belt extending about said third and fourth toothed belt sprockets.

* * * * *